Patented Feb. 4, 1936

2,029,773

UNITED STATES PATENT OFFICE 2,029,773

PROCESS FOR OBTAINING PRODUCTS CONTAINING SPINELS

Ture Robert Haglund, Stockholm, Sweden

No Drawing. Application May 17, 1933, Serial No. 671,591. In Sweden September 16, 1932

18 Claims. (Cl. 75—22.5)

This invention relates to methods of obtaining products containing spinels from such molten masses containing silicic acid which on solidifying form spinels. Such masses may be obtained either as by-products, for example in metallurgical reducing processes or may be produced separately by melting a suitable predetermined charge.

According to the invention by regulating the content of lime the silicic acid lime is entirely or for the greater part bound in the mass during the solidification in the form of silicic acid compounds containing lime and these compounds are subsequently entirely or partially removed, for example, by known dressing or dissolving out processes. Valuable products containing spinels then result as the final product.

The quantity of material containing calcium oxide added to the charge is preferably proportioned according to the invention so that the mass during or after the cooling completely crumbles or for the greater part breaks into powdered and granular material. Such a crumbling takes place chiefly with molten masses which are of strong basic nature and have a high percentage of calcium oxide. It is surprising that the crumbling of such silicic acid compounds containing lime is not prevented by the fact that spinel crystals are present in considerable quantities.

It has been found that the crumbling of the cooling or cooled fused masses takes place particularly rapidly if there are more than 2 mols of calcium oxide to 1 mol of silicic acid in the mass, and it has also been found that the crumbling also takes place if only about 20% of such silicic acid compounds containing lime are present in the mass, while in other respects the content of these silicates in the mass can vary within very wide limits.

The production of high-grade products containing spinels or also practically pure spinels from the cooled molten mass is preferably carried out so that the difference in the specific gravities of the spinels on the one hand and the silicate of lime on the other hand is utilized. Suitable processes are for example wind sifting processes, settling processes utilizing water flow apparatus, such as pointed bins, classifiers, shaking hearths and the like.

Another method of separating the silicates of lime is by chemical treatment, such as dissolving out processes. These include the treatment of cooled masses with hydrochloric acid or sulphur dioxide in aqueous solution or treatment with a chloride, such as aluminium chloride or some other salt. It is likewise possible to treat the mass with sulphuric acid solution. Thus a calcium sulphate mud is formed which can be subsequently separated by classification or according to some other dressing process.

The silicic acid liberated by the treatment with acid and remaining after the dissolving out of the lime in the spinel masses can also be separated by one of the above mentioned mechanical dressing processes. It is, however, possible under certain circumstances to dispense entirely or partially herewith and to use the silicic acid as binding medium when producing shaped bodies from the spinels.

The chemical treatment or the dissolving out process can also be applied in combination with mechanical dressing processes, for example for subsequently cleaning the separated spinel-masses, and also for obtaining spinels from material rich in calcium silicate and separated by mechanical dressing.

When employing sulphur dioxide solution, the resultant solution containing calcium sulphite may be employed for example in the cellulose sulphite industry.

When working a decomposed or crumbled slag it is advisable before employing mechanical dressing processes to first sift off the non-decomposed portions. It must also be mentioned in this connection that the decomposed mass may also be subjected to a gentle dry or wet grinding process in order to better separate the silicates on the one hand and the spinels on the other hand. This grinding treatment is, however, preferably carried out in such a manner that the existing spinel-crystals are destroyed as little as possible.

The grinding is, however, only advisable for part of the cooled molten mass, for example intermediate products separated during the dressing and which show a relatively large percentage of spinels and silicates. In such cases the grinding is followed by a further separation.

An intensive stirring in water, for example in a vessel provided with a stirring mechanism, before the separation or in certain stages of the separation has also proved advantageous. For the same purpose it is also advisable to store the masses or products from the separation in moist condition for a relatively long period.

A further improvement of the products can be obtained by employing magnetic separating processes. Magnets with relatively small magnetic fields may be employed for removing metal particles present in the fused mass or slag. Apparatus producing strong magnetic fields, such as the Ullrich magnetic separator, also enable the spinels to be separated from the silicate. The silicates are non-magnetic, whereas the spinels and any periclase crystals which may be present are generally attracted by strong magnetic fields. It is possible that this interesting phenomenon is due to the small content of ferrous oxide in the spinels and it is also possible to intensify the magnetic permeability by intentionally increasing the FeO content. Spinels with a high content of $Cr_2O_3$ show favorable effects on magnetic fields because these spinels have an increased magnetic permeability, perhaps on account of the fact that spinels relatively rich in chromium oxide generally also have a relatively high FeO content.

The magnetic separation is preferably combined with one or more of the above mentioned separation processes. Further separating processes which may be employed are electrostatic separation and the flotation processes which are particularly suitable in many cases for separating spinels, periclase and silicates.

The process described is primarily suitable for producing such spinels containing magnesium oxide which contains chiefly alumina or chromium oxide or both as acid components. A portion, for example 10%, of the magnesium oxide may, if necessary, be replaced by other oxides forming spinels, for example FeO. Such spinels can easily be produced from slags by suitably regulating the composition of the charge, which slags are obtained as by-product during the production of chromium or chromium alloys by reducing chromium ore or the like. Chromium ores usually contain both magnesium oxide and also alumina and by regulating the quantity of reduction medium it is possible to produce spinels with a high or low content of chromium oxide.

As above mentioned, material containing calcium oxide, preferably in the form of burnt lime, is added to the charge and the composition of the charge or of the slags is regulated in such a manner that the slag decomposes or crumbles after solidifying if left exposed to the air. The decomposed slag is subjected to a separation as above described.

Spinels with a low percentage of chromium oxide are obtained in this manner during the production of ferrochromium with a high percentage of carbon, for example 6 to 10% C. and 60 to 70% Cr. If ferrochromium containing about 4 to 6% of carbon is aimed at, spinels with a somewhat higher percentage of chromium oxide form at the same time. When working to obtain ferrochromium with a low percentage of carbon or chromium alloyed iron and steel by reduction of chromium ore or the like with a reducing agent containing carbon, the chromium oxide content of the slag must be kept high and in this manner spinels are usually obtained with a high percentage of chromium oxide, for example 30 to 40% and higher.

Masses and slags of the above mentioned kind can also be produced by direct interfusion of suitable raw materials. The charge should contain calcium oxide, magnesium oxide, alumina and/or chromium oxide. Suitable raw materials are magnesite, dolomite, bauxite and chromite. Spinels with a low percentage of or free from chromium oxide may be obtained for example by smelting a charge composed entirely or partly of dolomite and bauxite. The raw materials are preferably added to the furnace in calcined or sintered condition. Spinels with a high percentage of chromium oxide are on the other hand obtained by smelting chromium ore together with bauxite and dolomite. Impurities of iron oxides are preferably entirely or partially eliminated by reduction.

The size of the spinel grains can be influenced by the cooling of the molten mass and also by regulating the composition of the silicates containing calcium oxide. In this instance the rule is that slags with a long period of solidification also produce large spinel-crystals. The higher the melting point of the silicates is, the smaller will be the spinel-crystals obtained under otherwise similar conditions. If the slags or molten masses receive a considerable excess of magnesium oxide as compared with the quantity of alumina and chromium oxide, strong basic silicates are formed with a low content of alumina and a high melting point. Periclase crystals can at the same time be formed according to the content of magnesium oxide. In this instance the separation is preferably so conducted that the periclase crystals are obtained together with the spinels but, as above indicated, it is also possible to separate and if necessary work the periclase separately from the spinels.

By increasing the percentage of alumina and chromium oxide with respect to the magnesium oxide content silicates are produced with a higher percentage of alumina and chromium oxide and having a melting point lower than that of the strong basic silicates. As most of the chromium ores contain a higher percentage of magnesium oxide than is necessary for forming spinels $(MgOAl_2O_3)$, it is advisable when producing ferrochromium with a relatively high content of carbon, to add material containing alumina, for example alundum, bauxite or chamotte. Thus the interval of solidification is increased and the formation of larger spinel-crystals favored.

The spinel products according to the invention may be used for the preparation of refractory products, etc., in pulverulent or granular state, alone or in admixture with other substances.

Products according to the invention may be employed in pulverous state as refractory coating materials, preferably mixed with a small quantity of clay.

The employment of products according to the invention as grinding materials and finally the employment of spinels with a high percentage of chromium oxide for producing chromium or chromium alloys must also be mentioned.

*Examples*

1. When producing ferrochromium an excess of burnt lime was added to the charge comprising chromium ore, reducing agents, and a quantity of bauxite, so that a slag with about 24% CaO and 12% $SiO_2$ was produced. The slag was then removed from the furnace and cooled in the air. A few hours after the cooling it crumbled to powder and granular material.

This material was then subjected to a mechanical separation followed by a subsequent cleansing with acid and about 50% of the total quantity of the slag was obtained as separated material. This separated material had a composition of 60% $Al_2O_3$, 12% $Cr_2O_3$ and 27.6% MgO.

The separated and dissolved out portion of the slag consisting of silicates and periclase had the following composition: 47.8% CaO, 24.5% $SiO_2$, 22% MgO, 1.9% $Al_2O_3$ and 2% $Cr_2O_3$.

By way of comparison it may be mentioned that a slag with 23.7% CaO and 17.4% SiO₂ showed no tendency to crumble. The crumbling of the slag only takes place when the quantity of lime amounts to more than 2 mols of CaO to 1 mol of silicic acid and at the same time MgO calculated in mols, is equal to or exceeds the total of the mols of Al₂O₃ and Cr₂O₃. In the last mentioned instance the periclase formation can be obtained besides producing spinel crystals.

If the quantity of MgO in mols is less than the total of Al₂O₃ and Cr₂O₃ in mols the content of CaO, in order to obtain a crumbling slag must be regulated higher than according to the following rule:—

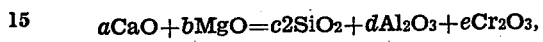

$a$, $b$, $c$, $d$, and $e$ being the contents in mols.

2. 100 parts by weight of calcined dolomite having a composition of 56% CaO, 37% MgO and 5% SiO₂ and 140 parts by weight of calcined bauxite having a composition of 70% Al₂O₃, 14% Fe₂O₃, 12% SiO₂ and 3% TiO₂ were charged into an electric furnace and melted under reducing conditions. The molten mass was then removed from the furnace and allowed to cool in the air. A few hours after cooling it crumbled to powdered and granular material.

3. 100 parts of dolomite and 140 parts of bauxite having the same composition as in Example 2, and 30 parts of calcined magnesite having a composition of 93% MgO, 3% FeO and 2% SiO₂ were melted in an electric furnace. The mass was removed from the furnace and, on cooling, crumbled to powder and granular material in a few hours. It was then subjected to a wet mechanical and subsequently to a magnetic separation. 140 parts of products containing spinels and periclase with a total of 36% MgO and 60% Al₂O₃ were obtained.

I claim:—

1. A process for producing highly refractory products consisting in the main part of spinels of the type RO.R₂O₃, comprising fusing raw materials containing spinel-forming oxides and silica and lime while regulating the charge so that the solidified molten mass consists of spinels and silicates rich in calcium, the latter being present to at least 20% and removing at least partly compounds of calcium from the solidified mass.

2. A process as specified in claim 1, comprising fusing a charge with so high content of calcium oxide, at least about 2 mols CaO to 1 mol SiO₂, that the molten mass on cooling after solidifying at least partly disintegrates into powder, grains and the like.

3. A process as specified in claim 1, comprising using a so high calcium oxide content in the charge, that the whole amount of silica on solidifying will be bound in form of silicates of self-disintegrating nature.

4. A process for producing highly refractory products consisting in the main part of spinels of the type RO.R₂O₃, comprising fusing raw materials containing spinel-forming oxides and silica and lime while regulating the charge so that the solidified molten mass consists of spinels, periclase, and silicates rich in calcium the latter being present to at least 20% and removing at least partly compounds of calcium from the solidified mass.

5. A process as specified in claim 1, comprising carrying through the melting operation of the accordingly regulated raw mixture in a reducing atmosphere, thus removing iron, being present in the raw material, and eventually a part of chromium, being present as spinel-forming oxide, as metal or alloy.

6. A process for obtaining products containing spinels, comprising feeding into an electric furnace a charge containing dolomite and bauxite, melting the charge in the furnace, while adjusting the proportions of the charge so that the cooled molten mass consists of spinels and silicates with a high content of lime and removing at least part of the latter compounds.

7. A process for obtaining products containing spinels comprising feeding into an electric furnace a charge containing chromium ore, bauxite and dolomite, melting the charge and separating the iron impurities by reduction, the charge being so adjusted that the cooled molten mass consists of spinels and silicates with a high content of lime and removing at least part of the latter compounds.

8. A process for obtaining products containing spinels comprising feeding into an electric furnace a charge containing chromium ore and high grade materials of the oxides of aluminium and calcium melting the charge and separating the iron impurities and chromium by reduction, the charge being so adjusted that the cooled molten mass consists of spinels and silicates with a high content of lime and removing at least part of the latter compounds.

9. A process for obtaining products containing spinels comprising feeding into an electric furnace a charge containing dolomite, bauxite and magnesite, melting the charge, the charge being so adjusted that the cooled molten mass consists of spinels and silicates with a high content of lime and removing at least part of the latter compounds.

10. A process for obtaining products containing spinels, comprising feeding into an electric furnace a charge containing dolomite and bauxite, melting the charge in the furnace, while adjusting the proportion of the charge so that the cooled molten mass consists of spinels, periclase and silicates with a high content of lime and removing at least part of the latter compounds.

11. A process for obtaining products containing spinels comprising feeding into an electric furnace a charge containing chromium ore, bauxite and dolomite, melting the charge and separating the iron impurities by reduction, the charge being so adjusted that the cooled molten mass consists of spinels, periclase and silicates with a high content of lime and removing at least part of the latter compounds.

12. A process for obtaining products containing spinels comprising feeding into an electric furnace a charge containing chromium ore and high grade materials of the oxides of aluminium and calcium melting the charge and separating the iron impurities and chromium by reduction, the charge being so adjusted that the cooled molten mass consists of spinels, periclase and silicates with a high content of lime and removing at least part of the latter compounds.

13. A process for obtaining products containing spinels comprising feeding into an electric furnace a charge containing dolomite, bauxite and magnesite, melting the charge, the charge being so adjusted that the cooled molten mass consists of spinels, periclase and silicates with a high content of lime and removing at least part of the latter compounds.

14. A process for obtaining products containing spinels comprising fusing in an electric furnace a charge containing chromium ore, lime and a reducing agent and adjusting the composition of the charge so, that the silica content of the chromium ore on the solidification of the slag is bound at least mainly in form of silicates rich in calcium and that formation of spinels consisting at least mainly of oxides of magnesium and aluminium takes place, and thereupon removing at least partly compounds of calcium.

15. A process for obtaining products containing spinels comprising fusing in an electric furnace a charge containing chromium ore, lime and a reducing agent and adjusting the composition of the charge so, that a self-disintegrating slag is formed, containing silicates of basic nature with at least about 2 mols of CaO to 1 mol $SiO_2$ and spinels with a high content of chromium oxide, and separating a high grade spinel product out of said slag.

16. A process for producing refractory products containing spinels comprising forming by melting a mass containing spinels and silicates rich in calcium, cooling it and thereafter removing the silicates.

17. A process for producing refractory products containing spinels comprising forming by melting a mass containing spinels and silicates with at least about 2 mols CaO to 1 mol $SiO_2$ cooling it and treating the solidified and self-disintegrated mass in wet mechanical settling apparatus to separate the components containing calcium oxide.

18. A process for producing refractory products containing spinels comprising forming by melting a mass containing spinels and silicates rich in calcium, cooling it and thereafter treating it with an acid for decomposing said silicates, and separating in a mechanical way decomposed undissolved parts of the silicates.

TURE ROBERT HAGLUND.